F. J. STOKES.
ROTARY TABLET MACHINE.
APPLICATION FILED NOV. 30, 1914.

1,289,570.

Patented Dec. 31, 1918.
2 SHEETS—SHEET 1.

WITNESSES:

INVENTOR
Francis J. Stokes
BY
ATTORNEY.

F. J. STOKES.
ROTARY TABLET MACHINE.
APPLICATION FILED NOV. 30, 1914.
1,289,570.
Patented Dec. 31, 1918.
2 SHEETS—SHEET 2.
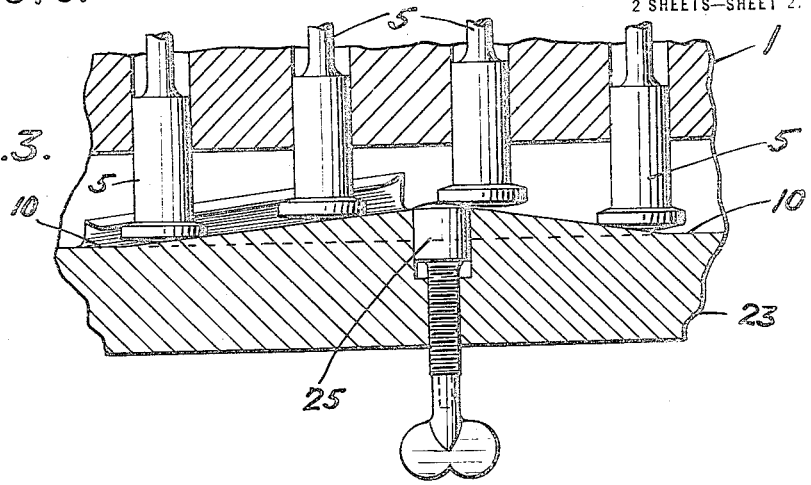
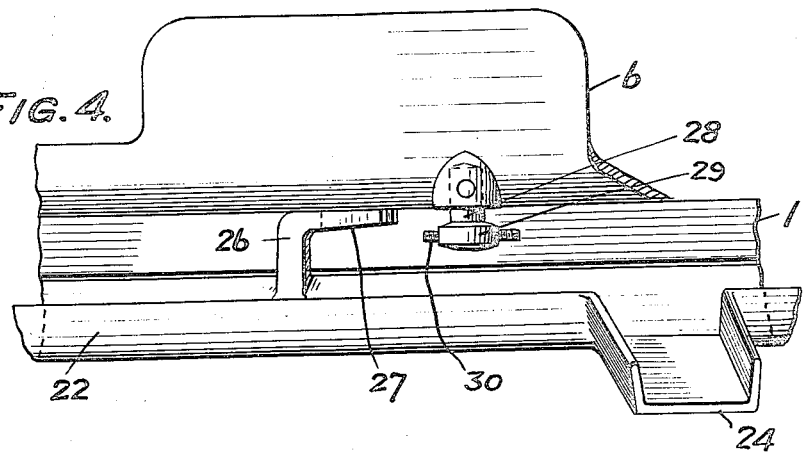
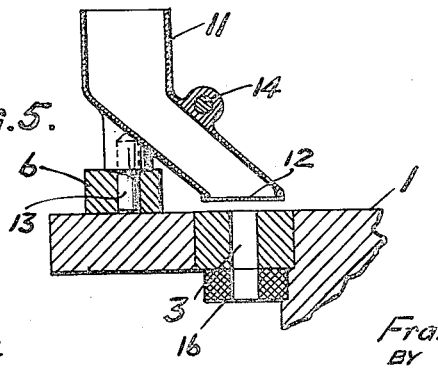
WITNESSES:
INVENTOR
Francis J. Stokes
BY
ATTORNEY.

UNITED STATES PATENT OFFICE.

FRANCIS J. STOKES, OF PHILADELPHIA, PENNSYLVANIA.

ROTARY TABLET-MACHINE.

1,289,570.   Specification of Letters Patent.   Patented Dec. 31, 1918.

Application filed November 30, 1914. Serial No. 874,613.

*To all whom it may concern:*

Be it known that I, FRANCIS J. STOKES, a citizen of the United States, and a resident of Philadelphia, in the county of Philadelphia and State of Pennsylvania, have invented certain new and useful Improvements in Rotary Tablet-Machines, of which the following is a specification.

The present invention relates to improvements in rotary tablet machines of the general type or style shown and described, for example, in Letters Patent of the United States No. 610,029 of August 30th, 1898, to E. C. Clark for a powder compressor, and the principal objects of the present invention are, first, to compress or make into tablets materials which need not have lubricating substances previously incorporated or mixed with them; second, to provide for accurately determining the size or quantity of the material in each tablet; third, to make purer and more uniform tablets; fourth, to simplify the preparation of the materials, and fifth, to avoid defects in and increase the efficiency of such machines.

The invention will be claimed at the end hereof, but will be first described in connection with the embodiment of it chosen for illustration in the accompanying drawings, in which—

Fig. 3, is a sectional view, drawn to an enlarged scale, and illustrating features of the invention.

Fig. 4, is an elevational view of a part of the machine illustrating features of the invention, and Fig. 5, is a sectional view, taken on the line 5—5 of Fig. 2.

Figure 1:
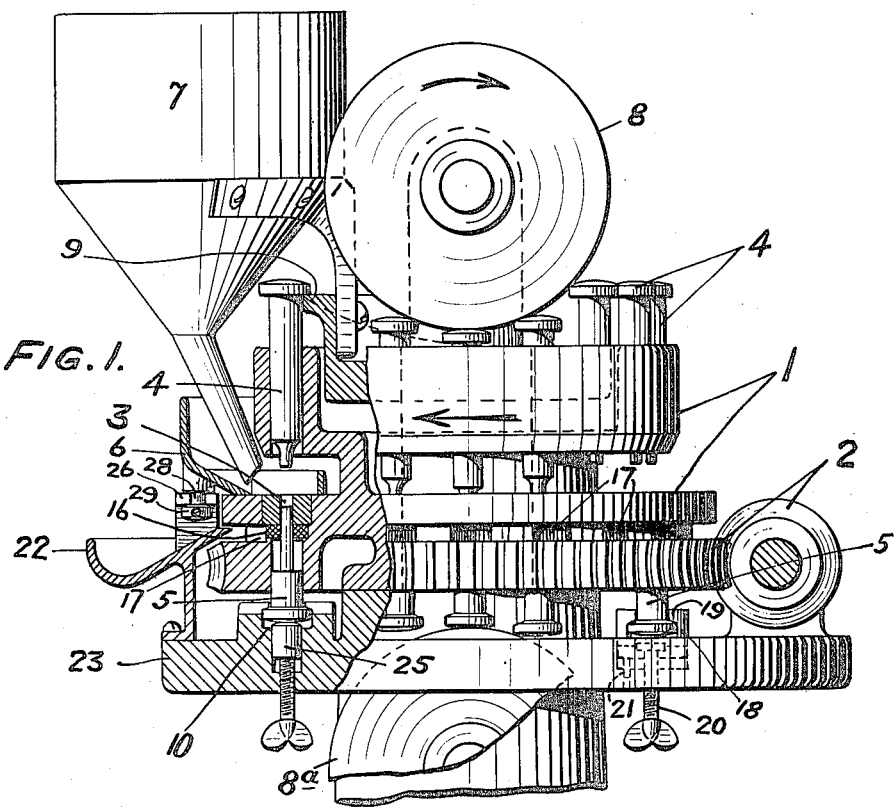
Figure 1, is a side view, partly in section, of so much of a rotary tablet machine as is necessary to illustrate features of the invention embodied therein.
Figure 2:
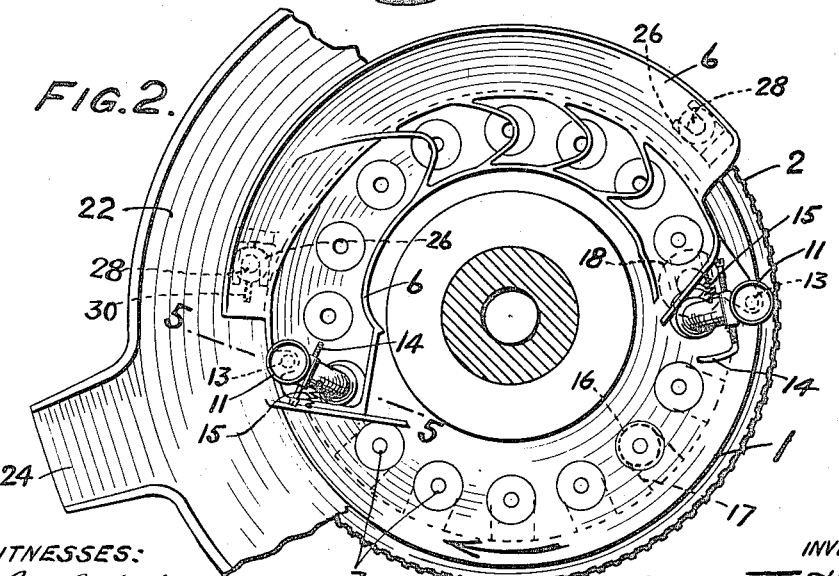
Fig. 2, is a top or plan view, partly in section, of the mechanism illustrated in Fig. 1.

In the drawings 1 is a rotary head driven for example by means of the worm and worm wheel 2. This head is provided with apertures that extend clear through it and constitute molds 3. The head is provided with top punches 4 and bottom punches 5 that coöperate with the molds 3. Punches are omitted toward the right-hand part of Fig. 1 for the sake of clearness. 6, is a feed frame that is fixed or stationary in respect to the head and it serves to feed material into the molds 3. 7, is a hopper that may be employed for delivering material to the feed frame. 8 and 8$^a$ are rollers for depressing the top punches and elevating the corresponding bottom punches, one after another, and 9 is a cam surface or slide for raising the top punches 4, one after another. Cams raise the bottom punches at intervals.

Considering one pair of punches the operation is that the bottom punch is lowered, the top punch is raised, the material is introduced into the molds by the feed frame, the bottom punch is raised to insure the presence of the predetermined amount of material in the mold, the punches press the material into tablet form, the top punch is lifted, and the bottom punch is raised and ejects the tablet. The punches operate in succession and continuously, but a description of one is sufficient for an understanding. There is nothing particularly new so far as the present description has gone.

11, are shakers consisting generally of a receptacle having a perforated or reticulated discharge 12. They are pivoted and spring retracted and are arranged at the opposite ends of the feed frame 6 in such position that they are operated by a rotating part of the machine at the appropriate times. As shown the shakers are pivoted as at 13 to the ends of the feed frame 6 and they are provided with adjustable arms 14 and are controlled or retracted by spring 15, and the arms are arranged in the path of the top punches. A lubricant, as talcum powder, is supplied to the shakers and as an empty mold approaches the filling frame, the shaker is operated in the manner described so as to deposit a little talcum powder in the mold on top of the bottom punch. After the mold has been filled, the other shaker deposits a little talcum powder on top of the material in the mold. The talcum powder prevents the punches from sticking to the tablet and its use in the shaker avoids the necessity of incorporating a much larger quantity of lubricant in the material prior to its being fed to the machine. The advantage of this is that the finished tablet is purer for the amount of lubricant superficially applied by the shakers is very small, and in fact, negligible in the tablet. A washer 16 is provided around each bottom punch and the washer is lubricated. As shown the rotary head is radially slotted as at 17 for the application of lubricant to the washer. By these means the bottom punch is properly lubricated so that it does not stick in the mold and this is accomplished without requiring the admixture of lubricant with the material that is compressed into tablets. The tablets are purer than in cases where lubricant is previously mixed with them and furthermore the preparation of the material which is fed to the machine is simplified, since no lubricant need be mixed with it. In the path of the lower punches there is inserted a shrouded cam 18 at the point where the bottom punches are to be lifted in order to eject any surplus material from the mold prior to the descent of the top punch. As shown this shrouded cam consists of a cylindrical member having a slot cut through it for the passage of the head of the bottom punches and leaving overhanging parts 19 under which the heads of the bottom punches run. It is overhanging parts, like 19, that are referred to by the term "shrouded". 20, is an adjusting screw having swivel connection with the shrouded cam so that the latter may be lifted and depressed while held against turning by its pin 21. The advantage of the shrouded cam section is that when the machine is running rapidly the punches as they rise to eject surplus material do not overthrow or ascend too far by reason of their momentum. This makes the ejection of the proper amount of material from the mold accurate and insures uniformity in the weight and size of the tablets.

From the foregoing description it will be understood that the purity of the tablets and their uniformity are increased. Necessarily some of the material will collect in and about the rotating head and might fall. If the material is of value, as is often the case, it is conceivable that such material may be returned to be made into tablets and in some cases it might not be desirable to permit the material to be thus contaminated. The gutter 22, constituting an extension of the guard for the gear wheel 2, is carried by the machine frame 23 and encircles the rotating head to the extent necessary and receives any material that may reach it, and from the gutter this material may be collected as by means of the spout 24 and returned for reuse in uncontaminated condition. The feed frame 6 is fixed and it should be positioned close to the surface of the rotary head, which runs under it, yet jamming must be avoided. As shown a part of the machine frame, for example, the gutter 22 is provided with a fork 26 having inclined surfaces 27 and the feed frame 6 is provided with a pin 28 having a tapered head 29 and a screw stop 30. The motion of the rotary head tends to shift the feed frame 6 toward the left in Fig. 4, so that when the fork and head of the pin, or more accurately, the beveled surfaces thereof, are in contact the screw stop 30 limits the extent to which the feed frame can be drawn downward in such a way that jamming is avoided and accuracy of feed insured. The necessary adjustment can be made by turning the screw stop.

The bottom punches are subject to wear and they must properly eject the tablets quite near the feed frame, and unless the tablets are properly ejected they tend to get back into the feed frame and hence be destroyed. In the cam-way 10 and at the place where the tablets are ejected there is provided an adjustable cam section 25 located at the high part of the cam so that it is this cam section 25 which controls the height to which the punches are raised in ejecting the tablets and by adjusting the height of this section 25 the ejection operation can be accurately controlled.

From the foregoing description it is evident that the described improvements coöperate to provide uniform tablets of great purity and to obviate the possibility of accidental destruction of the tablets after they have been made.

What I claim is:

1. In a rotary tablet machine the combination of a rotary head provided with molds and punches, and a spring retracted pivotally mounted shaker having a perforated open bottom and disposed in the path of rotation of the head, whereby the shaker is periodically jarred as the head revolves to shake some of its contents out of its perforated bottom.

2. In a rotating tablet machine the combination of a rotary head provided with molds and punches, means for reciprocating the punches in respect to the molds, means for feeding the molds, and a pivoted spring retracted shaker spaced angularly in advance and in rear of the feeding means and in range of the punches which collide with and turn and free the shakers one before and the other after the feeding.

3. In a rotating tablet machine the combination of a rotary head provided with molds and punches, a fixed feeding frame, and pivotal spring retracted shaker arranged at the end of the frame and in line with the punches by which it is turned and released and jarred, substantially as described.

4. The combination in a rotary tablet machine of a rotary head and its molds and punches, a gear wheel on the head, mechanism for operating said parts, a fixed feeder frame, and a fixed gear guard provided with an outward gutter arranged part way around the head and in proximity with the feeder.

5. In a rotary tablet machine the combination of the machine frame, a rotating head provided with molds, a feed frame fixed in respect to the head and at its top surface, and a fork with inclined surfaces and a pin with tapered head and a screw stop interposed between the feed and machine frames.

6. In a rotary tablet machine the combination of the machine frame, a rotating head provided with molds, a feed frame fixed in respect to the rotation of the head and arranged at its top surface, devices interposed between the machine frame and the feed frame and provided with inclined surfaces of engagement, and a stop, substantially as described.

In testimony whereof I have hereunto signed my name.

FRANCIS J. STOKES.

Witnesses:
M. T. MONTAGUE,
M. A. WALTER.